P. F. MORRIS.
NUT LOCK.
APPLICATION FILED JUNE 7, 1916.

1,209,475.

Patented Dec. 19, 1916.

Witness
George W. Wright

Inventor
P. F. Morris.

By

UNITED STATES PATENT OFFICE.

PATRICK F. MORRIS, OF BUTTE, MONTANA.

NUT-LOCK.

1,209,475.  Specification of Letters Patent.  Patented Dec. 19, 1916.

Application filed June 7, 1916. Serial No. 102,249.

*To all whom it may concern:*

Be it known that I, PATRICK F. MORRIS, a citizen of the United States, residing at Butte, in the county of Silverbow and State of Montana, have invented certain new and useful Improvements in Nut-Locks; and I do hereby declare the following to be a full, clear, and exact description of the invention, such as will enable others skilled in the art to which it appertains to make and use the same.

This invention has for its object to provide an improved and simplified nut lock of the pawl lock type embodying means for positively retaining the locking pawl in locked position.

Another object is the provision of a locking device for the pawl, which is so constructed as to permit the pawl to be released from operative engagement with the bolt.

Figure 1:
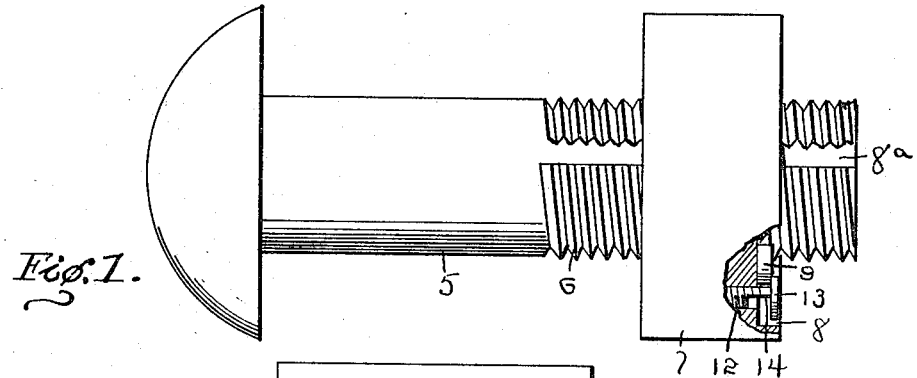
Figure 2:
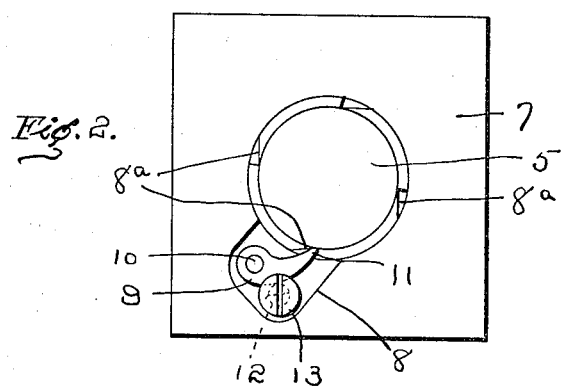
Figure 3:
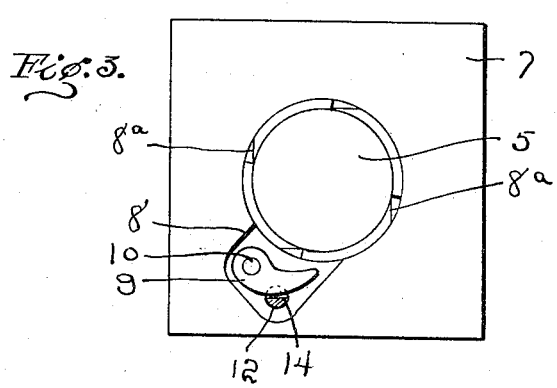
Figure 4:
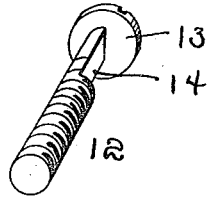

With this and other objects in view, the invention consists in the novel construction, combination and arrangement of parts as will be hereinafter specifically described, claimed and illustrated in the accompanying drawing, in which:

Figure 1 represents a side elevation of the improved nut lock partly in section, Fig. 2 represents an end elevation thereof, Fig. 3 represents an end elevation, similar to Fig. 2, partly in section and showing the pawl in released position, and Fig. 4 represents a perspective view of the pawl locking screw removed.

Referring to the drawing in detail, wherein similar reference numerals indicate corresponding parts throughout the several views, the numeral 5 indicates a bolt of the usual or any preferred construction having the usual external screw threads 6 extending inwardly from one end thereof upon which is fitted an internally screw threaded nut 7. The bolt 5 is formed, in the screw threaded portion thereof, with a series of longitudinal grooves $8^a$ adapted to coöperate with the pivoted locking element to lock the nut against rotary movement, as will hereinafter appear.

The outer face of the nut 7 is formed with a recess 8 communicating with the bore thereof and receiving a pawl 9, which is pivotally secured at 10 to the nut and is provided with a tapered extremity 11 adapted to engage in any one of the several grooves $8^a$ to lock the nut against rotary movement. A screw 12 is fitted in an internally screw threaded opening formed transversely through the nut 7 and is provided at its outer extremity with a head 13 adapted, as the screw is advanced into the nut 7, to firmly grip the pawl 9. The screw 12 is so arranged, with relation to the pawl 9, as to engage and lock the latter in such position as to retain the tapered extremity 11 thereof in engagement with the slot or groove $8^a$ in the bolt. The portion of the screw adjacent the head 13 is cut away, as indicated at 14, whereby, when the screw is properly adjusted, the pawl 9 may be swung outwardly to the position shown in Fig. 3 to release the nut from the bolt. In use, the screw 12 is adjusted, as shown in Fig. 3, to release the pawl 9 and permit the bolt 5 to be advanced to the desired position through the nut. When properly adjusted, the screw 12 is given a half turn, thereby moving the groove on the outer surface thereof into engagement with the adjacent edge of the pawl 9 and swinging the tapered extremity 11 of the latter into one of the grooves $8^a$ in the bolt and effectively locking the nut against rotary movement thereon. It is also evident that as the screw is rotated to swing the pawl inwardly the threads of the screw effect an inward movement of the latter, thereby firmly engaging the head 13 against the outer surface of the pawl and preventing accidental displacement of the screw and consequently locking both parts of the lock against movement. The outer face of the head 13 is preferably formed with a diametrical slot adapted to receive the blade of a suitable tool, whereby the screw may be conveniently adjusted.

What is claimed is:

A nut lock including a bolt having a series of longitudinal grooves, a nut fitted upon said bolt, a pawl pivotally secured to said nut adapted to engage in one of said grooves to lock said nut against rotary movement upon the bolt, a screw fitted in said nut engaging and retaining said pawl in operative engagement with said bolt and having a portion thereof cut away to accommodate and permit said pawl to swing out of engagement with said bolt, and a head on said screw movable against the outer face of said pawl.

In testimony whereof I affix my signature in presence of two witnesses.

PATRICK F. MORRIS.

Witnesses:
 THOMAS DUFFY,
 MARTIN HIGGINS.

Copies of this patent may be obtained for five cents each, by addressing the "Commissioner of Patents, Washington, D. C."